United States Patent
Heitz et al.

(10) Patent No.: US 9,365,233 B2
(45) Date of Patent: Jun. 14, 2016

(54) STEERING COLUMN WITH COMPOSITE FIBRE ELEMENTS PRODUCED IN A BRAIDING METHOD

(71) Applicants: Thomas Heitz, Mauren (LI); Sebastian Regner, Rebstein (CH); Arne Schacht, Feldkirch (AT)

(72) Inventors: Thomas Heitz, Mauren (LI); Sebastian Regner, Rebstein (CH); Arne Schacht, Feldkirch (AT)

(73) Assignee: THYSSENKRUPP PRESTA AG, Eschen (LI)

( * ) Notice: Subject to any disclaimer, the term of this patent is extended or adjusted under 35 U.S.C. 154(b) by 0 days.

(21) Appl. No.: 14/386,625

(22) PCT Filed: Mar. 11, 2013

(86) PCT No.: PCT/EP2013/000713
§ 371 (c)(1),
(2) Date: Sep. 19, 2014

(87) PCT Pub. No.: WO2013/139447
PCT Pub. Date: Sep. 26, 2013

(65) Prior Publication Data
US 2015/0047456 A1   Feb. 19, 2015

(30) Foreign Application Priority Data

Mar. 20, 2012   (DE) .......................... 10 2012 005 434

(51) Int. Cl.
*B29C 33/00* (2006.01)
*B62D 1/16* (2006.01)
(Continued)

(52) U.S. Cl.
CPC .............. *B62D 1/16* (2013.01); *B29C 45/0053* (2013.01); *B29C 45/14* (2013.01);
(Continued)

(58) Field of Classification Search
CPC ....... B62D 1/16; B29C 45/0053; B29C 45/14
USPC ......... 264/240, 241, 255, 257, 258, 261, 262, 264/294, 295, 297.2
See application file for complete search history.

(56) References Cited

U.S. PATENT DOCUMENTS

| 5,632,940 A | 5/1997 | Whatley |
| 5,915,796 A * | 6/1999 | Beyer ........................ B60B 5/02 264/640 |
| 2004/0255462 A1* | 12/2004 | Schroeder ................ B60B 1/06 29/894.35 |

FOREIGN PATENT DOCUMENTS

DE   10242527 A1   4/2003
DE   69810553 T2   10/2003
(Continued)

OTHER PUBLICATIONS

German Language International Search Report for International patent application No. PCT/EP2013/000731; mailing date Jul. 25, 2013.
(Continued)

*Primary Examiner* — Stella Yi
(74) *Attorney, Agent, or Firm* — thyssenkrupp North America, Inc.

(57) ABSTRACT

The invention relates to a steering column for a motor vehicle, comprising a steering spindle mounted rotatably in a steering spindle bearing unit, and comprising a guide bracket for connecting the steering spindle bearing unit to a body of the motor vehicle, wherein at least one component of the steering column is formed at least in part from a fiber-reinforced composite material, wherein a component has a thin-walled braided core which corresponds to the shape of the subsequent component, is formed from a thermoplastic material, and is braided with a fiber material, wherein the braided core is produced in an injection molding method and contains functional elements molded therein.

10 Claims, 7 Drawing Sheets

(51) Int. Cl.
  *B29C 45/00* (2006.01)
  *B29C 45/14* (2006.01)
  *B29C 45/16* (2006.01)
  *B29K 105/00* (2006.01)
  *B29K 705/00* (2006.01)
  *B29L 9/00* (2006.01)
  *B29L 31/30* (2006.01)

(52) U.S. Cl.
  CPC .... *B29C 45/1671* (2013.01); *B29C 2045/1692* (2013.01); *B29K 2105/25* (2013.01); *B29K 2705/00* (2013.01); *B29L 2009/003* (2013.01); *B29L 2031/30* (2013.01)

(56) References Cited

FOREIGN PATENT DOCUMENTS

| DE | 10259593 | B4 | 7/2004 |
| DE | 102004025245 | A1 | 12/2005 |
| EP | 0091671 | A2 | 10/1983 |
| WO | 99/03716 | | 1/1999 |

OTHER PUBLICATIONS

English Translation of International Search Report for International patent application No. PCT/EP2013/000731; mailing date Jul. 25, 2013.
English translation of abstract for EP0091671(A2).
English abstract of corresponding Great Britain pat. No. GB2379637(A). Note, an English translation of the abstract DE10242527(A1) is not available.
English abstract of corresponding EP pat. No. EP0900943 (A1). Note, an English translation of the abstract DE69810553 (T2) is not available.
English abstract of corresponding WO pat. app. pub. No. WO2004057082. Note, an English translation of the abstract DE10259593(A1) is not available.
English Abstract of DE102004025245(A1).

* cited by examiner

STEERING COLUMN WITH COMPOSITE FIBRE ELEMENTS PRODUCED IN A BRAIDING METHOD

CROSS REFERENCE TO RELATED APPLICATIONS

This application is a U.S. National Stage Entry of International Patent Application Serial Number PCT/EP2013/000713, filed Mar. 11, 2013, which claims priority to German patent application no. 102012005434.3, filed Mar. 20, 2012.

FIELD

The present invention relates to a steering column for a motor vehicle, and to a method for producing a steering column.

BACKGROUND

Steering columns for motor vehicles are multipart subassemblies in which a steering spindle or steering shaft is mounted in a bearing unit. The bearing unit itself is often mounted pivotably with respect to a bracket, so that height adjustment of the steering wheel is possible. In addition, there is also often provision for the steering column to be telescopic for the purpose of adjusting the position of the steering wheel axially. The bracket itself is fastened in the body of the motor vehicle. The height adjustment and axial adjustment of the steering column may take place electromechanically or purely mechanically. Moreover, the steering column is a carrier for numerous functional elements which may comprise electrical components, such as steering column control stalks and operating buttons on the steering wheel, and also electromechanical components, such as the ignition lock. In modern motor vehicles, therefore, steering columns are complex subassemblies.

Steering columns not only have to ensure the mechanical functions which are necessary for the steering operation, but must also minimize the risk of injury to the driver in the event of a crash by exactly defined deformation and energy absorption. These tasks are contradictory to a basic requirement in motor vehicle construction, whereby the components used should have as low a weight as possible so as to keep the overall weight of the vehicle low.

For this purpose, it is known to produce individual components of vehicles, motor vehicle steering columns, from fiber-reinforced composite material.

German patent DE 698 10 553 T2 shows an adjustable steering column with a lock, which has a toothed quadrant made from a glass fiber-reinforced plastic.

The publication DE 10 2004 025 245 A1 discloses a hybrid crossmember of a motor vehicle, using composite fiber material.

The publication WO 99/03716 which is to be considered as constituting the preamble shows an energy absorber for motor vehicles, which is manufactured from a fiber material.

U.S. Pat. No. 5,632,940 shows a bicycle pedal crank made from composite fiber material.

Methods for producing motor vehicle parts from carbon fiber braiding are likewise known, for example, from German patent specification DE 102 59 593 B4 which describes a braiding method which makes it possible to reinforce the carbon fiber braiding in specific regions by reversing the working direction during the braiding operation.

DETAILED DESCRIPTION

Figure 1:
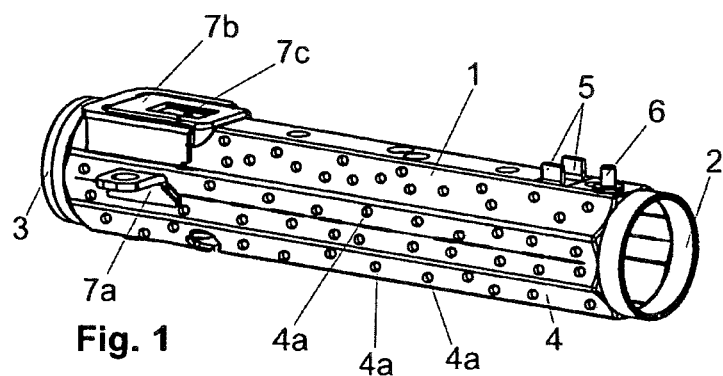
FIG. 1 shows an embodiment of a braided core in the geometry of a steering spindle bearing unit with lateral functional elements.

Proceeding from this prior art, the object of the present invention is to provide a steering column in which complexly configured structural elements are stiffened by fiber reinforcement with a composite material, so that a molding which is not sufficiently stable per se acquires the necessary mechanical properties by means of composite fiber material, while having overall a lower weight. Moreover, the object of the present invention is to provide a method, by means of which structural elements on a motor vehicle steering column can be produced in the required form, while at the same time the method is to be suitable for series production.

Since, in a steering column for a motor vehicle, with a steering spindle mounted rotatably in a steering spindle bearing unit and with a guide bracket for connecting the steering spindle bearing unit to a body of the motor vehicle, at least one component of the steering column being formed at least partially from a fiber-reinforced composite material, there is provision, further, whereby a component has a braided core which corresponds to the form of the subsequent component and is made from a thin-walled plastic and which is braided around with a fiber material, and since the braided core is produced in an injection molding method, the braided core can remain in the finished component.

Preferably, the component is an element of the steering column subsequently to be manufactured, which element supports the steering spindle indirectly or directly.

If there is provision further, whereby the braided core contains injected functional elements, these functional elements are already present after the braiding-around operation and do not have to be added later. Functional elements may in this case be fastening tabs, guides, movement limitations or else holders for cable harnesses or the like. It is in this case also conceivable and possible to integrate functional elements for electrical contacting and active or passive vibration dampers into the braided core. Preferably, the fastening elements are stamped and bent parts which are introduced into the braided core and which have been injected around in an injection molding method. These are preferably sheet metal tabs with orifices, bores or recesses.

In the steering column according to the invention, the guide bracket may be designed directly for fastening to the vehicle body or may be fastened indirectly to the body, for example via a rotary joint and a holding bracket, in order to afford the possibility of adjustment.

Suitable fiber material comprises especially fibers made from carbon (=carbon fibers) or aramide. However, further, fibers made from plastic, such as, for example, polyester or POM, and also made from glass, metal, ceramic or natural fibers, may also be used. It is conceivable and possible also to use a mixture of various fibers, in particular those listed above.

In a preferred embodiment, the component is a guide bracket for a steering spindle bearing unit, which guide bracket is configured in cross section to be open on one side. This component may initially be injected thermoplastically as a guide bracket which is U-shaped in cross section, this braided core then having low inherent stability. Before the braiding-around operation, the braided core may be connected to an auxiliary core in order to simplify handling. The braided core, which, in this preferred embodiment, is held by the auxiliary core, is braided around and is thereby reinforced from the outside with fibers. After the curing of the composite fiber material, the auxiliary core can be removed. However, due to the use of an auxiliary core, it is also conceivable and possible to remove the auxiliary core before the complete curing of the fiber material. Cycle times can thereby be saved in a continuous operating mode. To expose the upwardly open side of the guide bracket, the fiber material is then removed there by cutting or milling.

There may also be provision for producing a steering spindle bearing unit with a thermoplastically produced braided core of low inherent stability and with braiding around with a composite fiber material. In this case, preferably, the braided core having the composite fiber material is manufactured as a continuous part which has multiple lengths of the finished structural element and which can then be cut into individual pieces after the curing of the composite fiber material.

In the method according to the invention, the following steps are provided:
a) the production of a simple braided core which has essentially the geometry of the component to be produced;
b) fastening of the braided core to an auxiliary core;
c) braiding of the fibers around the braided core;
d) curing of a synthetic resin or of a thermoplastic material in the fiber structure, in order to achieve curing of the composite material and an internal connection to the braided core.

Further, there may be provision for removing the braided core after curing in step d. There may preferably be provision for manufacturing a plurality of similar structural elements in one production operation, in that a continuous profile is used as the braided core in step a, and, in a further method step, the workpiece thus produced is separated into individual parts after curing.

In the case of components which are to be configured to be open or partially open on one longitudinal side, there may advantageously be provision, in a further step, after curing, for opening this side by cutting or milling. This method variant has the advantage that the relatively simple manufacturing operation of braiding around on all sides with the fiber material can also be carried out on the subsequently open side, and that, after curing, the desired structure can be provided, and in this case the desired form and strength can be achieved in a similar way to structural elements which are braided around over the entire circumference. In this case, there may be provision for covering the separation edges of the fibers by resin or adhesive, in order to make it even more difficult for the fibers to be disentangled later.

For mounting and functioning in the steering column of the motor vehicle, it is advantageous if functional elements, preferably in the form of stamped and bent parts, are incorporated into the braided core or are connected to the braided core. In an especially simple embodiment, stamped and bent parts in the form of tabs or strips are introduced into the mold which is provided for producing the braided core, and these components are then injected around in an injection molding method and are thus connected captively to the braided core.

Preferably, the braiding operation is executed in such a way that the individual fiber strands are braided onto the braided core around the functional elements during the braiding operation, so that the functional elements project, between the individual fiber strands of the fiber material, above the subsequent surface. In this case, there may be provision whereby the functional elements are already arranged in the braided core such that, in the subsequent braiding operation, they lie between the individual fiber strands. Fiber strands may be guided at angles of about 20° to 85° with respect to the longitudinal axis of the component. The functional elements can then also be arranged at corresponding angles to the longitudinal axis of the component. In addition, stationary threads, as they are known, may be provided, which are oriented at a very small angle of about 0° or at an angle in the range of 0° to 3° for the longitudinal axis and are arranged on the surface of the braided core and are also braided in during braiding.

One or more exemplary embodiments of the present disclosure are described in more detail below by reference to the drawing figures of the present disclosure.

Figure 15:
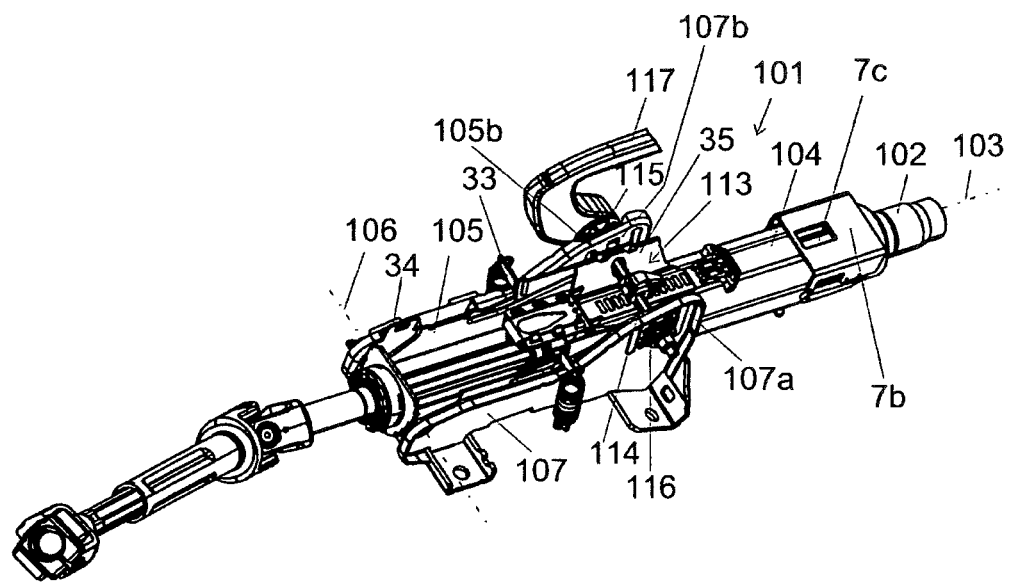
FIG. 15 shows an embodiment of a steering column according to an embodiment of the present disclosure.
Figure 16:
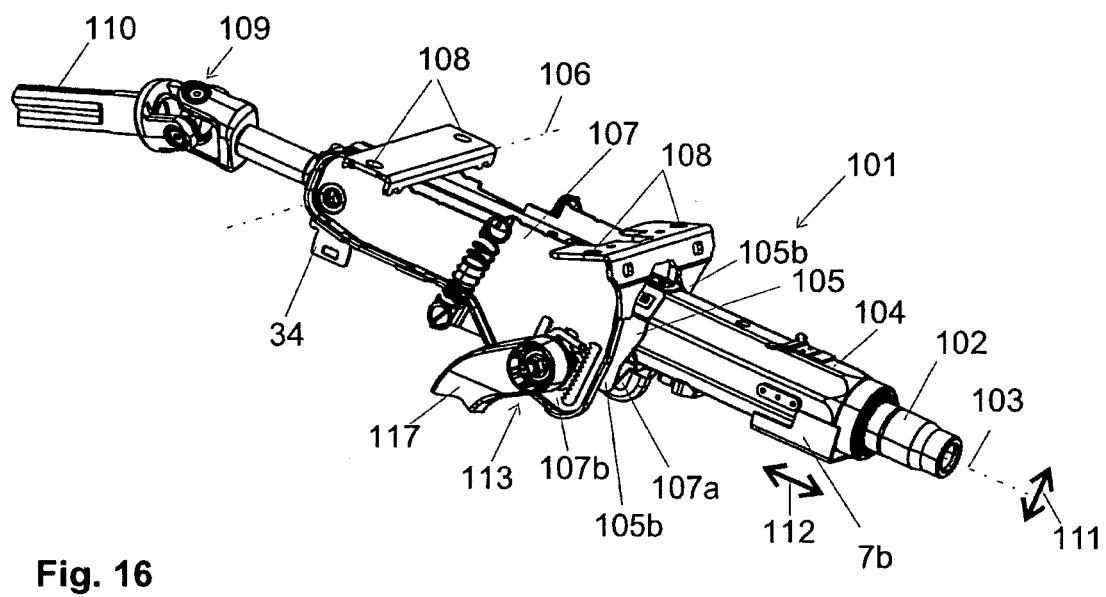
FIG. 16 shows another view of the steeling column from FIG. 15, according to an embodiment of the present disclosure.

FIGS. 15 and 16 illustrate a steering column 101 according to the invention, which comprises a steering spindle 102 which is mounted rotatably about its axis of rotation 103 in a jacket unit 104 (also called a steering spindle bearing unit hereafter). The jacket unit 104 is guided displaceably along the longitudinal axis 103 of the steering spindle in a guide bracket 105. The guide bracket 105 is mounted pivotably about a pivot axis 106 in a holding part 107. The holding part 107 can be fastened to the body, not illustrated, at fastening points 108. The rotational movement introduced into the steering spindle 102 by a driver via a steering wheel (not illustrated) is introduced into the steering gear, not illustrated, via a cardan joint 109 and further steering shaft parts 110. To increase the driver's comfort, the steering column can be adjusted in height in the adjustment direction 111 and in length in the adjustment direction 112. For this purpose, a fixing mechanism 113 is provided, which comprises a tension apparatus known in the prior art. The tension apparatus has a tension bolt 114, a cam mechanism 115, a thrust bearing 116 and a tension lever 117. As a result of the tension lever 117 being rotated, the two cams of the cam mechanism 115 are rotated with respect to one another and the side cheeks 107a, 107b are drawn together, with the result that frictional bracing of the side cheeks 107a, 107b of the holding part 107 with the side faces of the guide bracket 105, and in turn, with side faces of the jacket unit 104 takes place.

The tension bolt 114 passes through long holes in the side cheeks 107a, 107b of the holding part 107 and holes in the side faces 105a, 105b of the guide bracket 105. The cam mechanism 115 is arranged on one end of the tension bolt 114 and the thrust bearing 116 is arranged on the other end of the tension bolt. The side cheeks 107a, 107b, the side faces 105a, 105b and the jacket unit 104 are arranged between the cam mechanism 115 and the thrust bearing 116.

As a result of the actuating lever 117 being rotated, the fixing system 113 can be selectively changed over to an open position or a closed position. In the open position, the steering spindle 102 or the steering wheel (not illustrated in the figures) fastened thereto can be adjusted in position, in particular displaced in the longitudinal direction 112 and the height or inclination direction 111. In the closed position of the fixing system 113, the steering column is fixed in position. Steering columns of this type are known in the prior art.

Based on the example of a steering spindle bearing unit 104, FIGS. 1 to 7 show an illustration of the steering spindle bearing unit with fiber material which is braided around a braided core, the figures sometimes being illustrated highly diagrammatically.

Based on the example of a guide bracket 105, FIGS. 8 to 14 show an illustration of the guide bracket with fiber material which is braided around a braided core, the figures sometimes being illustrated highly diagrammatically.

FIG. 1 illustrates a braided core 1 for a steering spindle bearing unit 104. The braided core 1 has a front bearing seat 2 and a rear bearing seat 3, between which an essentially octagonal tubular wall 4 extends. Functional elements, the guides 5, a stop 6 and holder 7a and attachment 7b with cutout 7c for a steering lock (not illustrated) to be fastened later, project outward beyond the wall 4.

The braided core 1 is manufactured in an injection molding method. For this purpose, the functional elements were prefabricated as sheet metal parts (stamped and bent parts) and introduced into an injection mold. The mold cavity of the injection mold corresponds to the braided core 1 illustrated in FIG. 1. After injection molding and removal from the mold, the structural element illustrated in FIG. 1 is obtained, which, because of a small wall thickness and because of the lightweight injection molding material having low rigidity in this mold, cannot yet be used as a steering spindle bearing unit. Insofar as it is possible cost-effectively, along with sufficient strength, cutouts 4a are introduced into the mold in order to save material and weight. This becomes possible because the required rigidities are achieved by braiding around and do not have to be provided by the braided core. The cutouts may be formed as through holes or as blind holes. Blind holes have the advantage that the inner space can be sealed off more easily with respect to the external circumference, this being advantageous for subsequent method steps.

Figure 2:
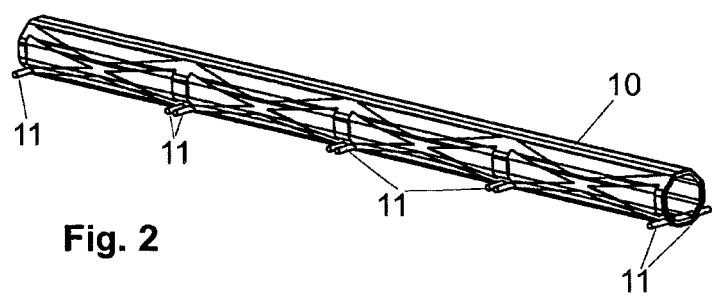
FIG. 2 shows an embodiment of a tubular braided core which comprises a plurality of steering spindle units one behind the other.

FIG. 2 shows diagrammatically a braided core 10 which comprises overall four units arranged one behind the other. The units are constructed essentially identically. Each of the four units corresponds essentially to the braided core 1 from FIG. 1. The braided core 10 has outwardly projecting functional elements which are illustrated merely diagrammatically as pins 11. They are configured, introduced and manufactured in a similar way to the functional elements 5, 6 and 7a, 7b, 7c from FIG. 1.

Figure 3:
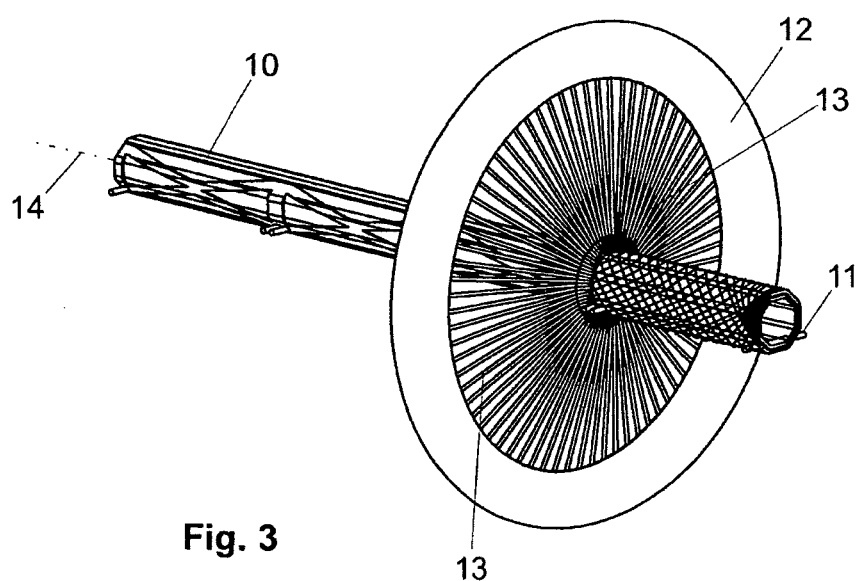
FIG. 3 shows the braided core from FIG. 2 in a diagrammatic illustration during the operation of braiding around with a fiber material, according to an embodiment of the present disclosure.

FIG. 3 illustrates a method step in which the braided core 10 is braided around with a fiber material in a multiplicity of fiber strands by what is known as "overbraiding". A braiding machine 12 discharges a number of fiber strands 13 which are laid around the braided core 10 according to a known method. This method is, for example, the basis of the document DE 102 59 593 B4 mentioned as prior art. The braiding operation takes place in the direction of a longitudinal axis 14 of the braided core 10 from that end face of the braided core 10 which faces the observer. The fiber bundles 13 are in this case laid onto the outer surface of the braided core 10 and are laid around the functional elements 11, so that the functional elements 11 project outward through the outer enveloping surface of the braided fibers.

Figure 4:
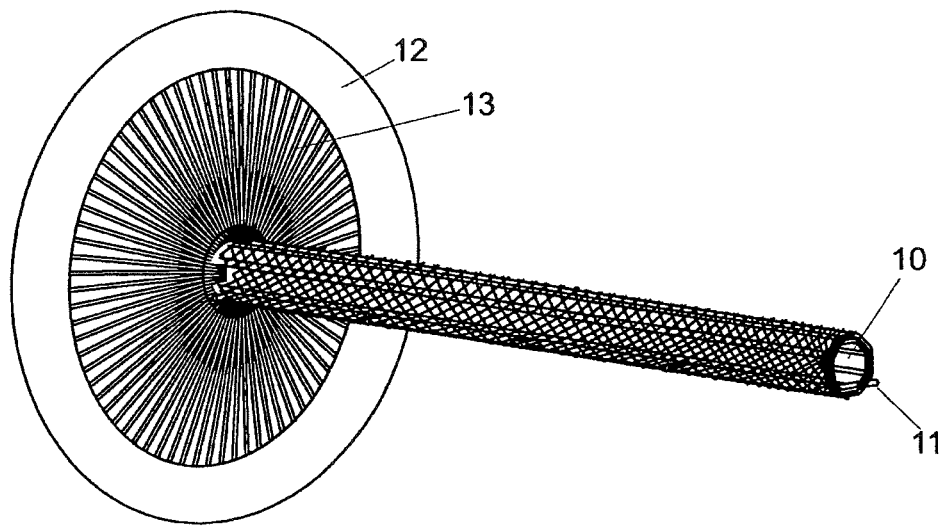
FIG. 4 shows the braided core from FIG. 3 in an almost completely braided-around state, according to an embodiment of the present disclosure.

FIG. 4 shows a further method step in which the braided core 10 has been braided around completely with fiber material. The braiding obtained lies on the outside of the braided core 10. The braiding machine 12 has arrived at that end of the braided core 10 which faces away from the observer. The fiber bundles 13 are detached there. The braided core 10 with the braiding lying on it is then present as an intermediate product of the production method. In practice, the braiding machine is stationary while the workpiece is transported in the direction of the longitudinal axis.

Figure 5:
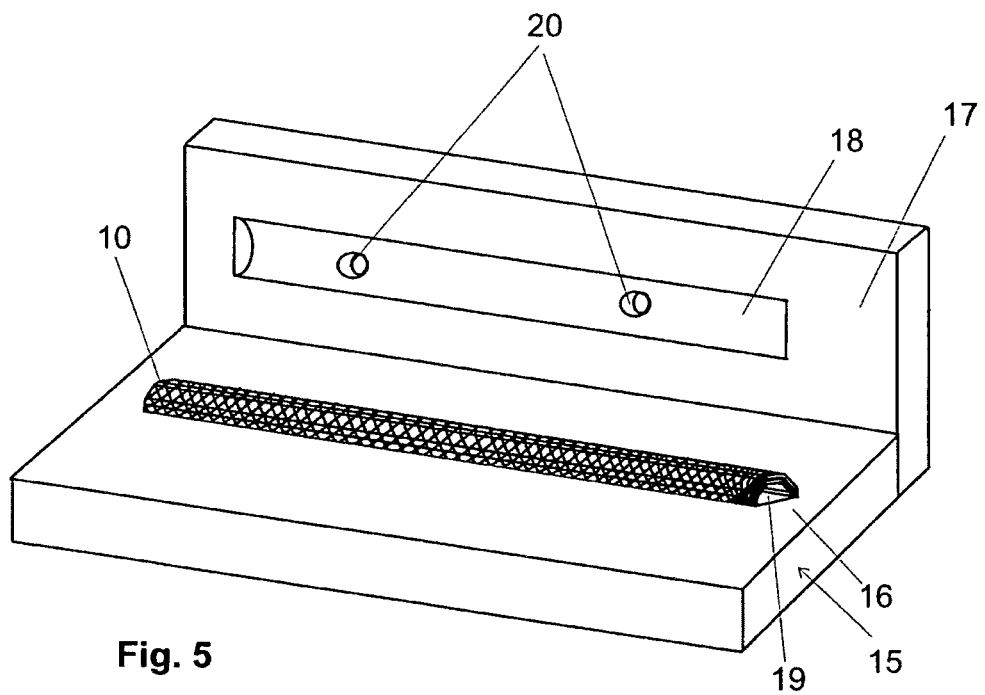
FIG. 5 shows the braided core from FIG. 4 with the fiber material applied to it, after the concluded braiding operation, introduced into a two-part open mold, according to an embodiment of the present disclosure.

FIG. 5 shows how the braided core 10, in the state in which it appears from the method step illustrated in FIG. 4, is introduced into a mold 15. The mold 15 is in two parts with an underside 16 and with a top side 17. The top side 17 has an approximately semicylindrical mold cavity 18. The mold underside 16 has a corresponding approximately semicylindrical cavity 19. The braided core 10 having the surrounding braiding is introduced into the mold cavity 19. It can also be seen that the mold top side 17 has, in the example, two filling orifices 20, through which the mold cavity is accessible from outside and which allow an inflow of resin and an outflow of air.

Figure 6:
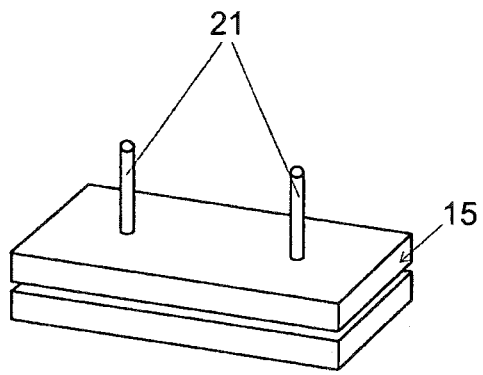
FIG. 6 shows the mold from FIG. 5 in the closed state, with a workpiece seated therein, according to an embodiment of the present disclosure.

FIG. 6 shows the mold 15 with the braided core seated in it, in the closed state. The mold cavity completely surrounds the braided core. A synthetic resin material can be introduced into the mold cavity through pipelines 21. The synthetic resin material can then penetrate into the braiding in the mold cavity on the outside of the braided core. In this case, means are advantageously provided which prevent synthetic resin from penetrating into the inner space of the braided core. The synthetic resin is subsequently cured. This may take place chemically or thermally. In the latter case, the mold 15 is preferably heatable. Alternatively, curing may also take place by means of ultrasonic heating or by UV radiation. For this purpose, corresponding means must be provided in the mold 15, for example ultrasonic sonotrodes or UV lamps with corresponding UV-permeable mold regions, so that the UV light can reach the workpiece. A combination of a plurality of these curing methods mentioned is also conceivable and possible.

Figure 7:
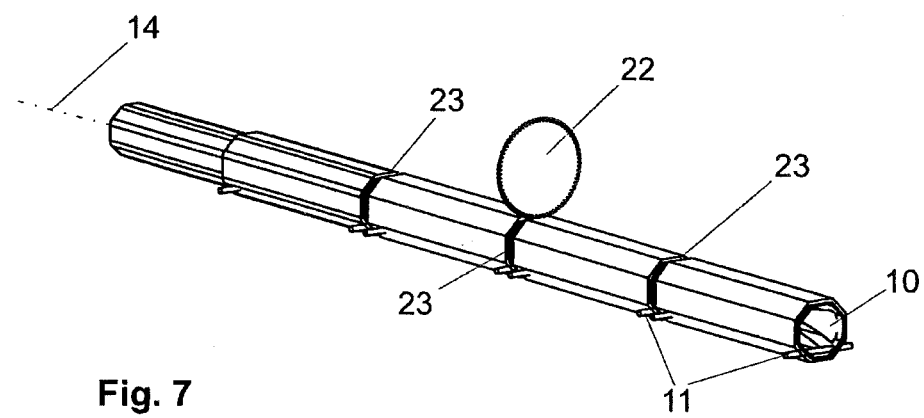
FIG. 7 shows the work piece removed from the mold after curing, with a diagrammatically indicated separating device for separation into individual steering spindle bearing units, according to an embodiment of the present disclosure.

FIG. 7 illustrates the braided core 10 with functional elements 11 in the state which is assumed after the curing of the plastic material and after release from the mold 15. As described above, the braided core 10 has a plurality of structurally identical units which are lined up with one another in the direction of the longitudinal axis. By means of a separation device 22, the braided core 10 is then separated transversally to its longitudinal axis 14 at locations 23 provided, in order to obtain individual components which ultimately correspond to the component from FIG. 1. As compared with the component from FIG. 1, which merely illustrates the braided core, the braiding around and curing of the synthetic resin on the outer surface however give rise to a component made from a composite material which, along with a low weight, has the strength which enables the component to be used in a motor vehicle as a steering spindle bearing unit. The functional elements 5, 6 serve for the fastening of crash elements and the functional elements 7a, 7b and 7c serve for the fastening of structural elements for a steering lock. Devices for holding electrical cables may also be provided. The functional elements 11 advantageously serve for assisting the separating operation, as a positioning aid and/or as holding means.

Figure 8:
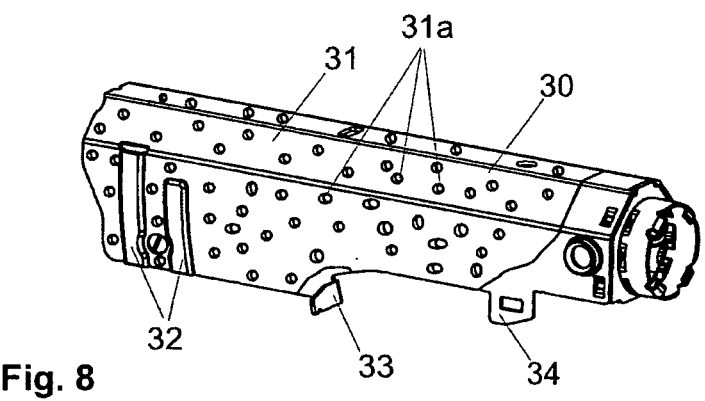
FIG. 8 shows a braided core for a guide bracket for connecting the steering spindle bearing unit to the body of a motor vehicle, according to an embodiment of the present disclosure.

FIG. 8 shows a braided core 30 for a guide bracket which is to be suitable for connecting a steering spindle bearing unit (for example, according to FIG. 1) to the body of a motor vehicle. According to the exemplary embodiment shown, connection to the body takes place via a rotary joint along the pivot axis 106 and via a holding bracket 107. However, it is also conceivable and possible to fasten the guide bracket directly to a body of a motor vehicle by corresponding fastening means. In this exemplary embodiment, too, the braided core 30 is manufactured as an injection molding, a wall 31 being manufactured from a thin-walled thermoplastic and carrying functional elements which comprise, for example, guide rails 32, stops 33 and cable holders 34.

For manufacture, the functional elements 32, 33 and 34 were introduced in the form of stamped and bent parts into the mold cavity of a corresponding injection mold. As a result of the injection of the thermoplastic, the wall 31 was then manufactured, which is firmly connected in a materially integral manner to the functional elements and which thus forms the braided core 30. The braided core 30, by being thin-walled and because of the material properties of the thermoplastic, is not suitable in the present form for use in a steering column of a motor vehicle as pivoting lever. Here, too, cutouts 31a may be provided in order to save material and weight.

Figure 9:
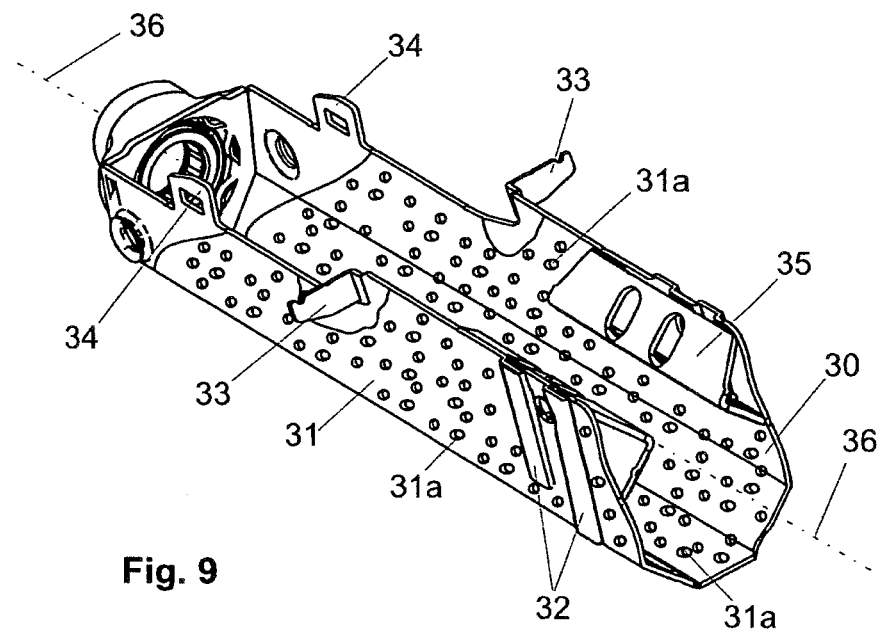
FIG. 9 shows the braided core for the guide bracket from FIG. 8 in another perspective illustration, according to an embodiment of the present disclosure.

FIG. 9 shows the braided core 30 from FIG. 8 in another perspective illustration. Identical structural elements bear the same reference numerals.

The braided core 30 has in cross section, approximately in the region of the stops 33, a U-shaped cross-sectional configuration which is delimited by an underside and two side walls and which is upwardly open in the illustration of FIG. 9. The guide rails 32 are also connected to clamping jaws 35 or arranged in the vicinity of the clamping jaws 35. The clamping jaws 35 narrow the inner cross section of the braided core 30 at one end. They complete the cross-sectional configuration of the braided core 30 in this region to form an upwardly open octagon. A steering spindle bearing unit, for example according to FIG. 1, can be introduced into this octagon. The steering spindle bearing unit is then telescopic in the longitudinal direction, that is to say in the direction of a longitudinal axis 36 of the braided core 30, with the result that axial adjustment of a steering wheel, not illustrated, is achieved. This set-up is basically known. The clamping jaws 35 serve, together with a clamping element arranged transversally to the longitudinal axis 35, for locking the steering spindle bearing unit in the guide bracket 105 in a clamping manner.

The clamping jaws 35 may likewise be functional elements which may already be introduced into the injection mold during the production of the braided core and which are then connected to the plastic material by means of the injection molding operation.

For the further processing of the braided core 30, braiding around with a fiber braiding, preferably with carbon fibers is provided, as indicated with regard to the steering spindle bearing unit in FIGS. 3 and 4.

Figure 10:
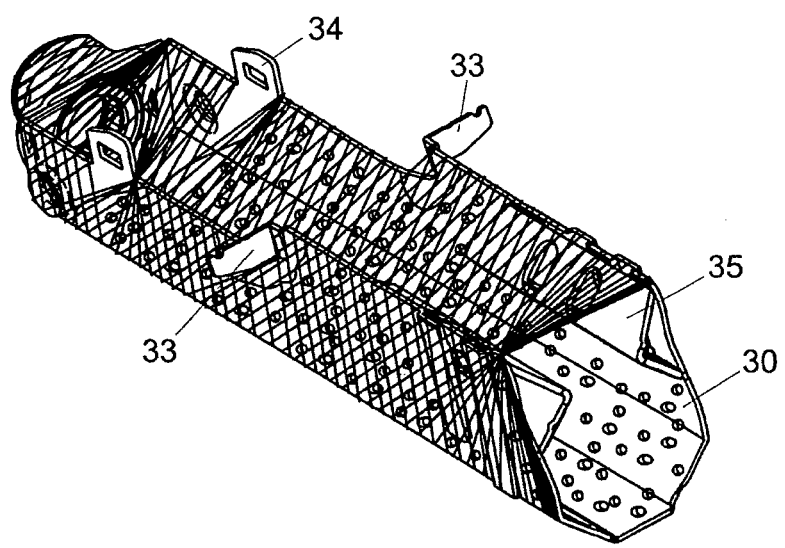
FIG. 10 shows the guide bracket from FIG. 9 with surrounding fiber material, having functional elements projecting above the braided fiber material, according to an embodiment of the present disclosure.

FIG. 10 shows the braided core 30 after the application of the fiber braiding. It can be seen that the functional elements (stops/spring support 33, cable holder 34) project above the outer surface of the braiding. During the braiding operation, the fiber bundles were guided such that they are laid around the projecting parts of the functional elements, in order to lie completely on the surface of the thermoplastic material of the braided core 30. The functional elements project in a freely accessible manner. The fiber bundles by which the braiding is generated are laid continuously around the braided core 30. They therefore also surround the open top side, visible in FIG. 9, and thus form an essentially tubular braiding which as an outer surface area stretches around the braided core 30.

Also, to provide a guide bracket, the braided unprocessed part can be introduced into a mold and saturated with synthetic resin and can subsequently be cured and removed from the mold, in a similar way to the procedure already described above for the steering spindle bearing unit. To prevent resin from penetrating into the cavity, either the braided core can be closed, as is not illustrated here, or an additional die element may be provided, which fills or shields the cavity to be formed and which thus prevents the penetration of synthetic resin.

Figure 11:
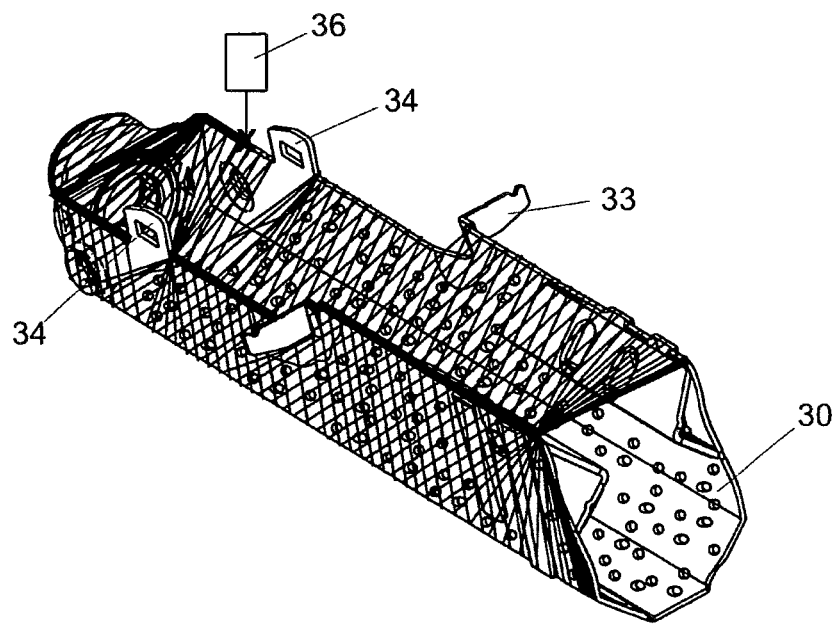
FIG. 11 shows the guide bracket from FIG. 10 in a diagrammatic illustration after the concluded curing of the composite fiber material, according to an embodiment of the present disclosure.

FIG. 11 illustrates diagrammatically that a synthetic resin material is injected out of a reservoir 36 into the braiding at a marginal portion. The marginal portion is in this case the region which forms the margin 37 after the component has subsequently been cut to size. By synthetic resin material being injected around, disentanglement of the finished component at this margin 37 is to be prevented. After the curing of the resin which surrounds the fibers and of the resin at the marginal portion, a tubular structure is obtained which forms an outer envelope of the braided core 30. This tubular structure is closed on the top side, for example, between the cable holders 34. This is not desirable in the case of the guide bracket, illustrated in the example, for a steering column of a motor vehicle.

Figure 12:
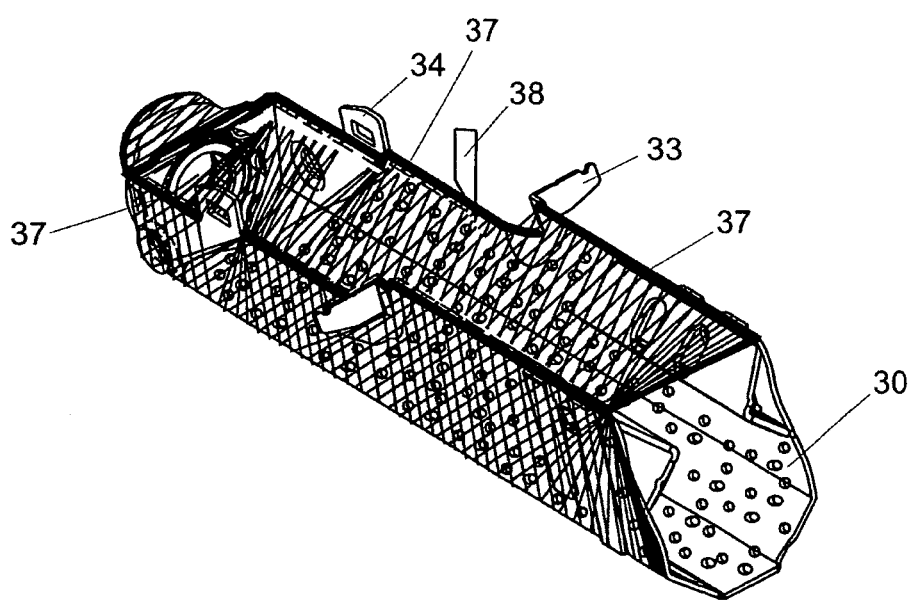
FIG. 12 shows the guide bracket from FIG. 11 with partially cut-open composite fiber material on the visible top side of the holding bracket, according to an embodiment of the present disclosure.
Figure 13:
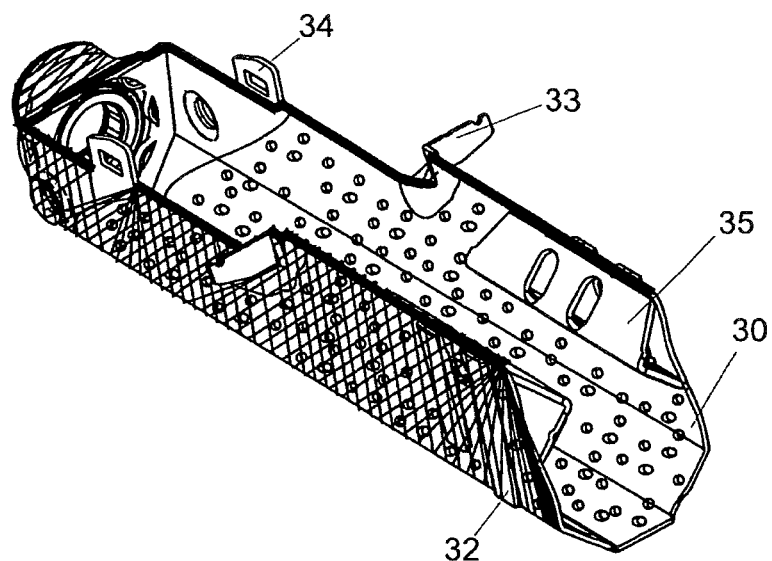
FIG. 13 shows the guide bracket from FIG. 12 with completely removed composite fiber material in the region of the open top side, according to an embodiment of the present disclosure.

It is therefore indicated in FIG. 12 that the composite fiber material is cut open or separated along a margin 37 on the top side of the braided core 30 by means of a separation tool 38, in order to open the top side, visible in FIG. 9, of the braided core 30. The composite fiber material is removed for this purpose. A suitable separation tool 38 is in this case a severing knife or else a laser beam. Finally, FIG. 13 illustrates the end product of the manufacturing operation. The method steps described result in a braided core 30 with functional elements and with a layer which surrounds the braided core on the outside and is composed of a composite fiber material which surrounds the braided core 30, is internally connected to the braided core 30 in a materially integral manner and stabilizes the braided core 30 to an extent such that a component having the appropriate strength is obtained. The method and the materials used yield the result that the component thus produced is especially lightweight, as in the case of the steering spindle bearing unit.

By virtue of a suitable production of the braided core, the guide bracket, as is illustrated in the examples, can also be produced in the form of units arranged one behind the other. Separation takes place after the curing of the resin with which the fibers braided with one another are previously saturated.

Figure 14:
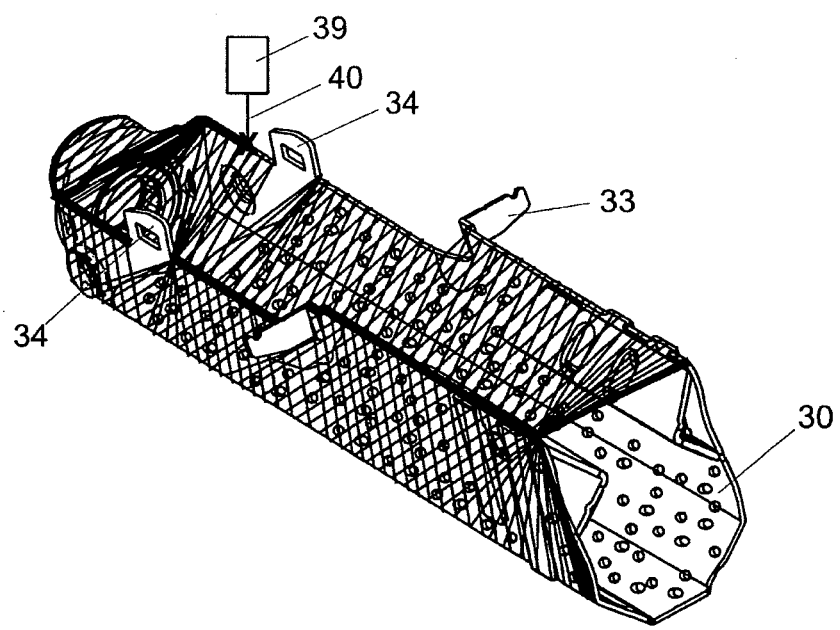
FIG. 14 shows the guide bracket from FIG. 10 in a diagrammatic illustration of a preparatory step for separating the composite fiber material, according to an embodiment of the present disclosure.

Other components of a motor vehicle steering column may also be produced by means of the method described. It is essential for this purpose that, in the first place, a lightweight braided core, which, however, is not yet suitable mechanically as a component, is manufactured in an injection molding method with functional elements introduced, that this braided core is braided around with a fiber braiding preferably made from carbon fiber and that the braided core is then stabilized in that a plastic material in the braiding is cured. The plastic material may in this case be introduced after the braiding-around operation, as in the exemplary embodiments described. Encased carbon fibers may also be used, which, in order to be cured, merely have to be heated and cooled again. In such cases in particular, alternatively to covering the marginal portion, as is described in connection with FIG. 11, cross-linking of the fibers in the marginal portion may also be carried out. A method step of this type is illustrated in FIG. 14. The finished braided-around braided core 30 is then irradiated with a laser beam 40 by a laser 39 along a marginal portion and is consequently heated correspondingly. Cross-linking of the marginal portion consequently takes place. After the separation of the fibers, which can be performed in a completely similar way to FIG. 12, the margin 37 of the component is secured by the cross-linking against disentanglement.

The invention claimed is:

1. A method of producing a steering column for a motor vehicle, comprising:
    forming a braided core from at least one of a thermoplastic or thermosettable polymer by an injection molding method, the braided core having substantially a geometry corresponding to a component of the steering column;
    coupling the braided core to an auxiliary core configured to improve ease of handling the braided core;
    braiding a second set of fibers around the braided core after the coupling of the braided core to the auxiliary core, the second set of fibers being suitable for use as a composite fiber material;
    curing at least one of a synthetic resin or a thermoplastic material at least between the braided core and the braided second set of fibers so as to materially integrally connect the braided core and the second set of fibers; and
    removing the auxiliary core after said curing the at least one of the synthetic resin or the thermoplastic material.

2. The method of claim 1, wherein the braided core is a series of integrally connected and formed braided cores, and wherein after said curing step, further comprising separating said series of integrally connected and formed braided cores into individual braided core components.

3. The method of claim 1, wherein said component of the steering column is a longitudinal component having a substantially U-shaped cross section including at least a partially open longitudinal side, and wherein after said curing step, further comprising removing at least a portion of both the braided second set of fibers and the at least one cured synthetic resin or thermoplastic material from the at least partially open longitudinal side.

4. The method of claim 1, wherein the braided core includes a plurality of functional elements integrally formed therein.

5. The method of claim 4, wherein said forming the braided core comprises:
    inserting the functional elements of at least one of a stamped metal tab or a bent strip into a mold configured to produce the braided core; and
    injection molding the braided core around at least a portion of the at least one stamped metal tab or the bent strip so as to integrally form a single unitary body.

6. The method of claim 5, wherein said braiding comprises laying individual fiber strands around the functional elements onto the braided core, such that the functional elements project between the individual fiber strands of the fiber material and above an outer surface of the braided core.

7. The method of claim 6, wherein the functional elements are oriented, with respect to the braided core, so as to lie parallel to and between at least a portion of the fiber strands following said step of braiding the second set of fibers around the braided core.

8. The method of claim 1, wherein fiber strands from the second set of fibers that are braided onto the braided core are oriented at angles of between about 20° and about 85° with respect to a longitudinal axis of the component following the braiding step.

9. The method of claim 8, wherein an angle of the fiber strands relative to the longitudinal axis of the component following the braiding step varies within a range of between about 20° and about 85°.

10. The method of claim 9, wherein the braided core includes a plurality of functional elements integrally formed therein, wherein the functional elements in a region in which the functional elements pass through the composite fiber material, are arranged at angles of between about 20° and about 85° relative to the longitudinal axis of the component.

* * * * *